(12) United States Patent
Looney et al.

(10) Patent No.: US 12,460,998 B2
(45) Date of Patent: Nov. 4, 2025

(54) APPARATUS AND METHOD FOR APPLYING TENSILE FORCE TO SAMPLES

(71) Applicant: The Board of Regents of the University of Oklahoma, Norman, OK (US)

(72) Inventors: Trevor Looney, Tulsa, OK (US); Michael F. Schmitz, South Bixby, OK (US); Jeffrey S. Volz, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 375 days.

(21) Appl. No.: 18/083,302

(22) Filed: Dec. 16, 2022

(65) Prior Publication Data

US 2023/0194401 A1 Jun. 22, 2023

Related U.S. Application Data

(60) Provisional application No. 63/291,241, filed on Dec. 17, 2021.

(51) Int. Cl.
*G01N 3/08* (2006.01)
*G01N 3/06* (2006.01)
*G01N 33/38* (2006.01)

(52) U.S. Cl.
CPC ............ *G01N 3/08* (2013.01); *G01N 3/066* (2013.01); *G01N 33/383* (2013.01); *G01N 2203/0017* (2013.01); *G01N 2203/0429* (2013.01); *G01N 2203/0617* (2013.01)

(58) Field of Classification Search
CPC ........ G01N 3/08; G01N 3/066; G01N 33/383; G01N 2203/0017; G01N 2203/0429; G01N 2203/0617; G01N 2203/0256; G01N 3/04
See application file for complete search history.

(56) References Cited

U.S. PATENT DOCUMENTS

| 7,051,600 | B1 * | 5/2006 | Cavallaro | G01N 3/08 73/862.041 |
|---|---|---|---|---|
| 10,024,773 | B1 * | 7/2018 | Schilling | G01N 3/20 |
| 2019/0170627 | A1 * | 6/2019 | Schaefer | G01N 3/08 |

FOREIGN PATENT DOCUMENTS

CA 2912163 C * 7/2021 ............ G01M 15/14

* cited by examiner

*Primary Examiner* — Benjamin R Schmitt
(74) *Attorney, Agent, or Firm* — Crowe & Dunlevy, P.C.

(57) ABSTRACT

A test apparatus and method for applying one or more tensile loads to a sample and for testing attributes of the sample exposed to the one or more tensile loads. The test apparatus includes a housing that has a plurality of interconnected sides that contain the sample during testing and provide a rigid support structure to offset the tensile loads applied to the sample. The test apparatus includes one or more force application assemblies that are each configured to apply a particular tensile load on the sample. Each of the force application assemblies includes an anchor for securing the sample to the housing, a connector attached to an opposite side of the sample from the corresponding anchor, and a tension rod assembly configured to apply the tensile load between the housing and the sample.

26 Claims, 6 Drawing Sheets

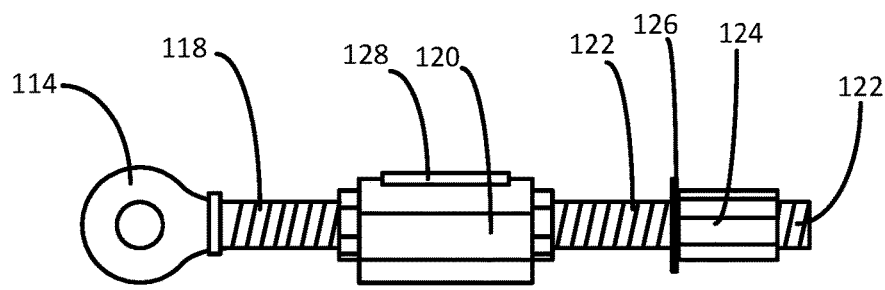
FIG. 4
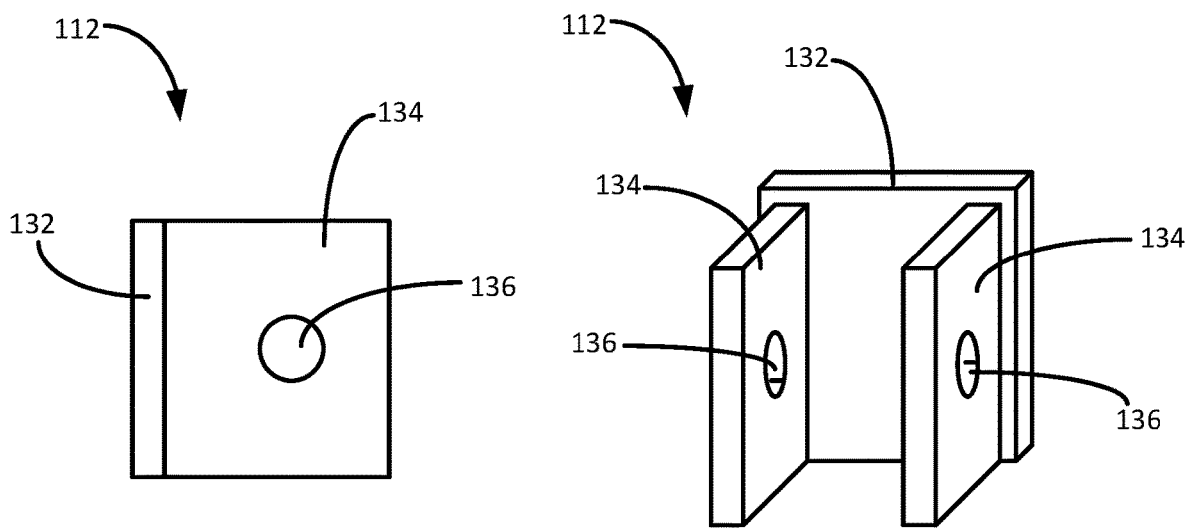
FIG. 5A
FIG. 5B
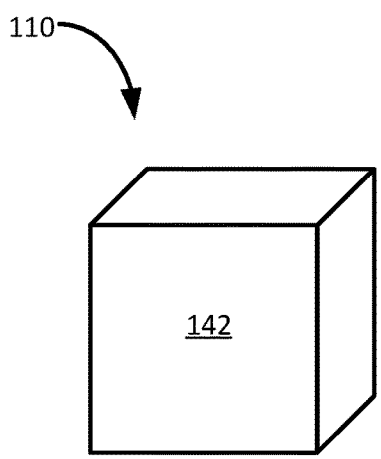
FIG. 6A
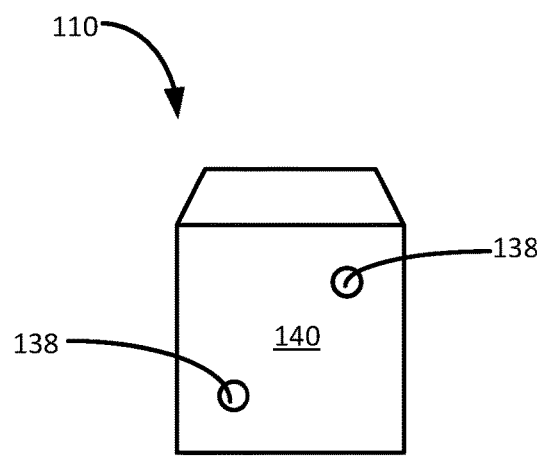
FIG. 6B

APPARATUS AND METHOD FOR APPLYING TENSILE FORCE TO SAMPLES

RELATED APPLICATIONS

This application claims the benefit of U.S. Provisional Patent Application Ser. No. 63/291,241 filed Dec. 17, 2021, entitled "Apparatus and Method to Determine Multiaxial Tensile Failure Criteria," the disclosure of which is herein incorporated by reference as if fully set forth below.

BACKGROUND

Ultra-high performance concrete (UHPC) is stronger and more durable than conventional concrete. UHPC often includes steel fibers which provide much larger tensile strengths than conventional concrete. Although UHPC outperforms conventional concretes in a number of evaluated categories, the large-scale production of UHPC has been somewhat limited due to the cost of proprietary UHPC products. The development of less expensive, non-proprietary mix designs has the potential to make UHPC more widely available.

As the use of UHPC increases, a need has arisen for improved analytical models that can accurately predict the maximal loading limits. The traditional concrete analysis and design method of ignoring tensile strength would be overly conservative and would not accurately predict behavior. There is, therefore, a need for an improved method for studying the multiaxial tensile behavior of UHPC to facilitate creating accurate analysis models and design guidelines.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness.

FIG. 4 depicts the adjustable tensile force module of the force application assembly of FIGS. 3A-3B.

FIGS. 5A-5B provide side and front perspective views, respectively, of the clevis bracket from the force application assembly of FIGS. 3A-3B.

FIGS. 6A-6B provide front and rear views, respectively, of the plinth from the force application assembly of FIGS. 3A-3B.

DETAILED DESCRIPTION

Figure 1:
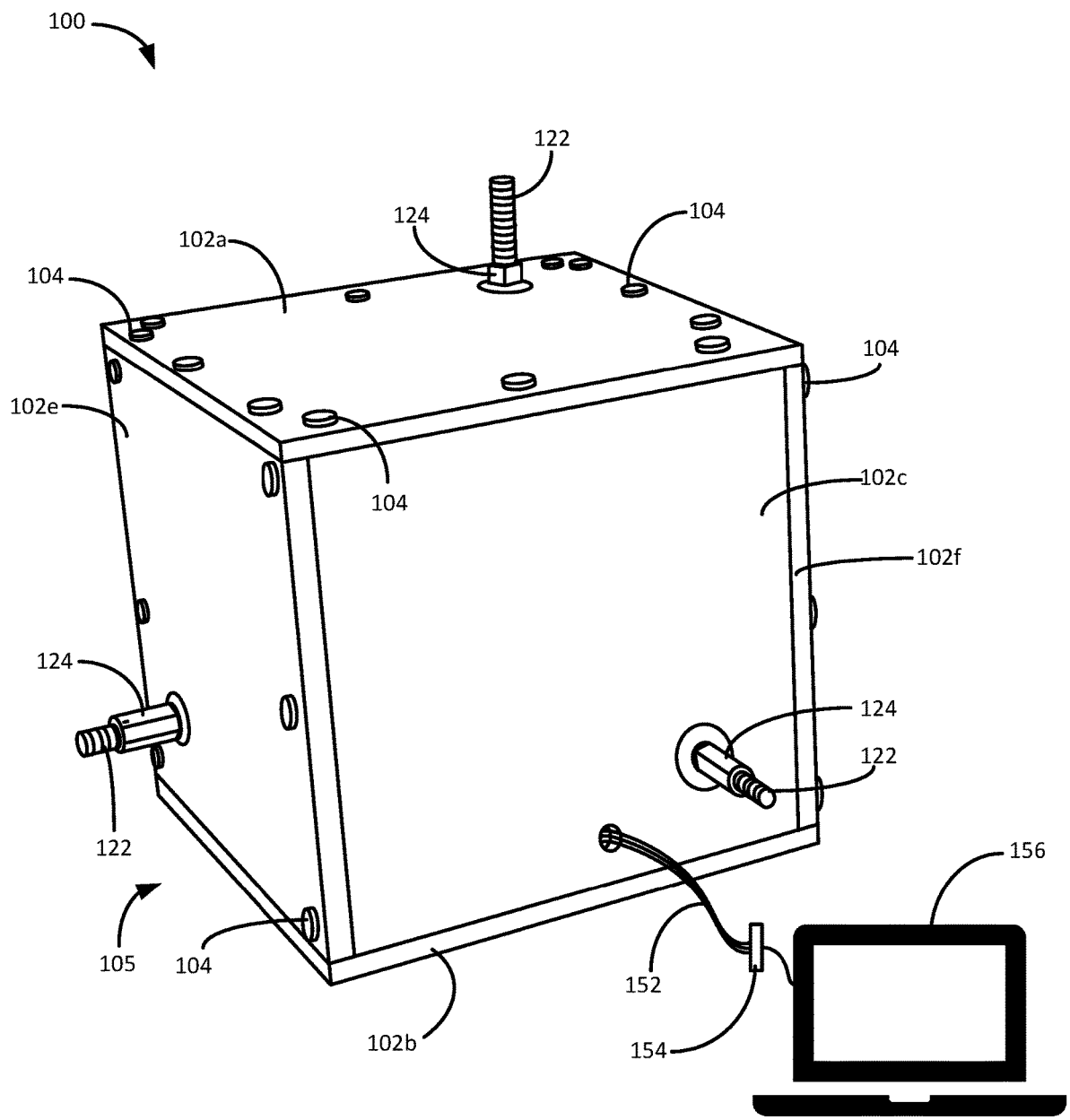
FIG. 1 is a perspective view of an embodiment of a tensile strength test apparatus constructed in accordance with an exemplary embodiment.

The present disclosure is generally directed to the construction and use of a test apparatus that is designed to evaluate the strength and failure modes of material samples subjected to the application of force in one or more axes. In exemplary embodiments, the test apparatus is used to determine multiaxial tensile loading applied to a cube or box-shaped (cuboid) sample, including uniaxial tensile loads, biaxial tensile loads, triaxial tensile loads, and mixed compression-tension loads in which a compressive force is applied in a first direction while tension forces are applied in second and/or third directions. The test apparatus is inexpensive to manufacture and operate, and overcomes many of the deficiencies encountered by conventional test equipment during the evaluation of materials such as, but not limited to, UHPC.

Before describing various embodiments of the present disclosure in more detail by way of exemplary description, examples, and results, it is to be understood that the embodiments of the present disclosure are not limited in application to the details of methods and apparatus as set forth in the following description. The embodiments of the present disclosure are capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that certain embodiments of the present disclosure can be practiced without these specific details. In other instances, features which are well known to persons of ordinary skill in the art have not been described in detail to avoid unnecessary complication of the description.

Unless otherwise defined herein, scientific and technical terms used in connection with the embodiments of the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which embodiments of the present disclosure pertain. All patents, published patent applications, and non-patent publications referenced in any portion of this application are herein expressly incorporated by reference in their entirety to the same extent as if each individual patent or publication was specifically and individually indicated to be incorporated by reference.

While the methods and apparatus of the embodiments of the present disclosure have been described in terms of particular embodiments, it will be apparent to those of skill in the art that variations may be applied thereto and in the steps or in the sequence of steps of the methods described herein without departing from the spirit and scope of the inventive concepts. All such similar substitutes and modifications apparent to those skilled in the art are deemed to be within the spirit and scope of the systems as defined herein.

As utilized in accordance with the methods and apparatus of the embodiments of the present disclosure, the following terms, unless otherwise indicated, shall be understood to have the following meanings.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the terms "about" or "approximately" are used to indicate that a value includes the inherent variation of error. Further, in this detailed description, each numerical value (e.g., time or frequency) should be read once as modified by the term "about" (unless already expressly so modified), and then read again as not so modified unless otherwise indicated in context. The use of the term "about" or "approximately" may mean a range including ±0.5%, or ±1%, ±2%, or ±3%, or ±4%, or ±5%, ±6%, or ±7%, or ±8%, or ±9%, or ±10%, or ±11%, or ±12%, or ±13%, or ±14%, or ±15%, or ±25% of the subsequent number unless otherwise stated.

As used herein, the term "substantially" means that the subsequently described event or circumstance completely occurs or that the subsequently described event or circumstance occurs to a great extent or degree. For example, the term "substantially" means that the subsequently described event or circumstance occurs at least 80% of the time, or at least 90% of the time, or at least 95% of the time, or at least 98% of the time.

Features of any of the embodiments described herein may be combined with any of the other embodiments to create a new embodiment. As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, all numerical values or ranges include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50. Similarly, fractional amounts between any two consecutive integers are intended to be included herein, such as, but not limited to, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, and 0.95. For example, the range 3 to 4 includes, but is not limited to, 3.05, 3.1, 3.15, 3.2, 3.25, 3.3, 3.35, 3.4, 3.45, 3.5, 3.55, 3.6, 3.65, 3.7, 3.75, 3.8, 3.85, 3.9, and 3.95. Thus, even if specific data points within the range, or even no data points within the range, are explicitly identified or specifically referred to, it is to be understood that any data points within the range are to be considered to have been specified, and that the inventors possessed knowledge of the entire range and the points within the range.

Reference to a series of ranges includes ranges which combine the values of the boundaries of different ranges within the series. For example, "a range from 1 to 10" is to be read as indicating each possible number, particularly integers, along the continuum between about 1 and about 10. Thus, even if specific data points within the range, or even no data points within the range, are explicitly identified or specifically referred to, it is to be understood that any data points within the range are to be considered to have been specified, and that the inventors possessed knowledge of the entire range and the points within the range.

Thus, to further illustrate reference to a series of ranges, for example, a range of 1-1,000 includes, for example, 1-10, 10-20, 20-30, 30-40, 40-50, 50-60, 60-75, 75-100, 100-150, 150-200, 200-250, 250-300, 300-400, 400-500, 500-750, 750-1,000, and includes ranges of 1-20, 10-50, 50-100, 100-500, and 500-1,000. The range 100 units to 2000 units therefore refers to and includes all values or ranges of values of the units, and fractions of the values of the units and integers within said range, including for example, but not limited to 100 units to 1000 units, 100 units to 500 units, 200 units to 1000 units, 300 units to 1500 units, 400 units to 2000 units, 500 units to 2000 units, 500 units to 1000 units, 250 units to 1750 units, 250 units to 1200 units, 750 units to 2000 units, 150 units to 1500 units, 100 units to 1250 units, and 800 units to 1200 units. Any two values within the range of about 100 units to about 2000 units therefore can be used to set the lower and upper boundaries of a range in accordance with the embodiments of the present disclosure.

The present disclosure will now be discussed in terms of several specific, non-limiting, examples, and embodiments. The examples described below, which include particular embodiments, will serve to illustrate the practice of the present disclosure, it being understood that the particulars shown are by way of example and for purposes of illustrative discussion of particular embodiments and are presented in the cause of providing what is believed to be a useful and readily understood description of procedures as well as of the principles and conceptual aspects of the present disclosure.

Beginning with FIG. 1, shown therein is a perspective view of the test apparatus 100 constructed in accordance with an exemplary, non-limiting, embodiment. The test apparatus 100 is generally configured as a six-sided box. In the embodiment depicted in FIG. 1, the test apparatus 100 includes a top side 102a, a bottom side 102b, a front side 102c, a back side 102d (not visible in FIG. 1), a left side 102e and a right side 102f (collectively, "sides 102"). The sides 102 can be constructed from metal and connected together with plate bolts 104 or other fasteners. In some embodiments, the sides 200 are constructed from ASTM B209 (2014) Grade 6061 (yield strength of 35,000 psi) aluminum plates. Each side 102 is thick enough to accommodate the plate bolts 104 and strong enough to withstand anticipated failure loads applied by the test apparatus 100 to the sample 200. For many test scenarios, the test apparatus 100 is configured to apply tensile loads of more than 5000 pounds. When assembled, the sides 102 provide a containment chamber 105 that secures the sample 200 during testing and provides a rigid structure against which the tensile test forces are generated.

Figure 2A:
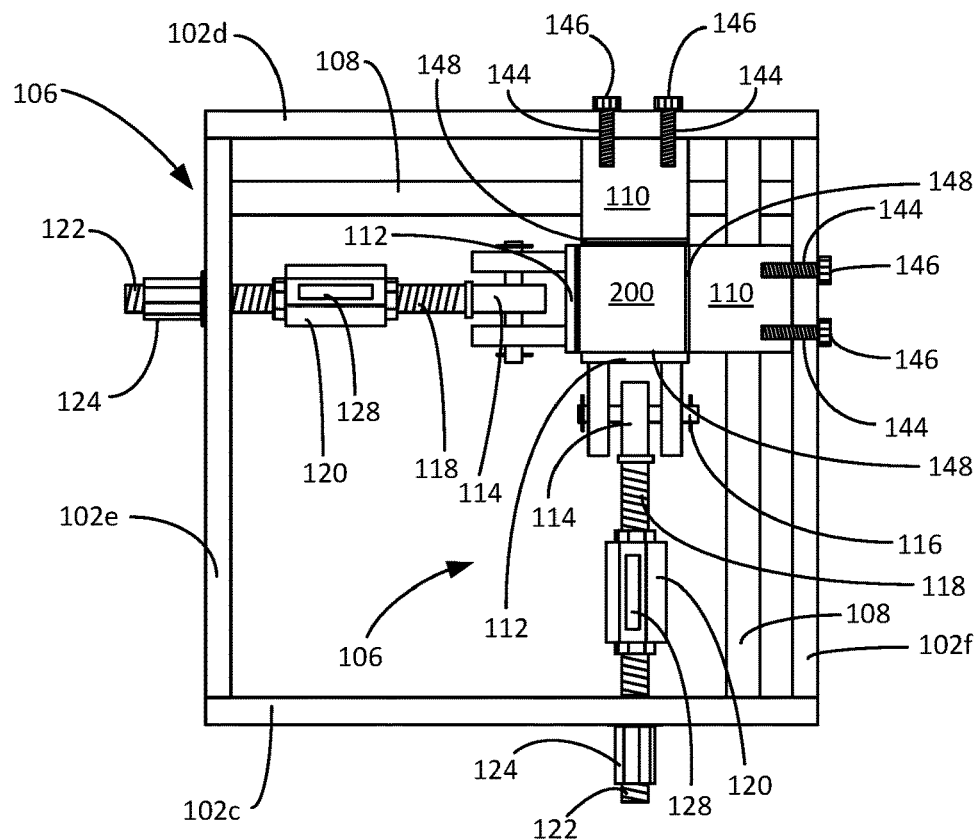
FIGS. 2A-2B provide top views of test apparatus illustrating the connection of the force application assemblies to the sample.
Figure 2B:
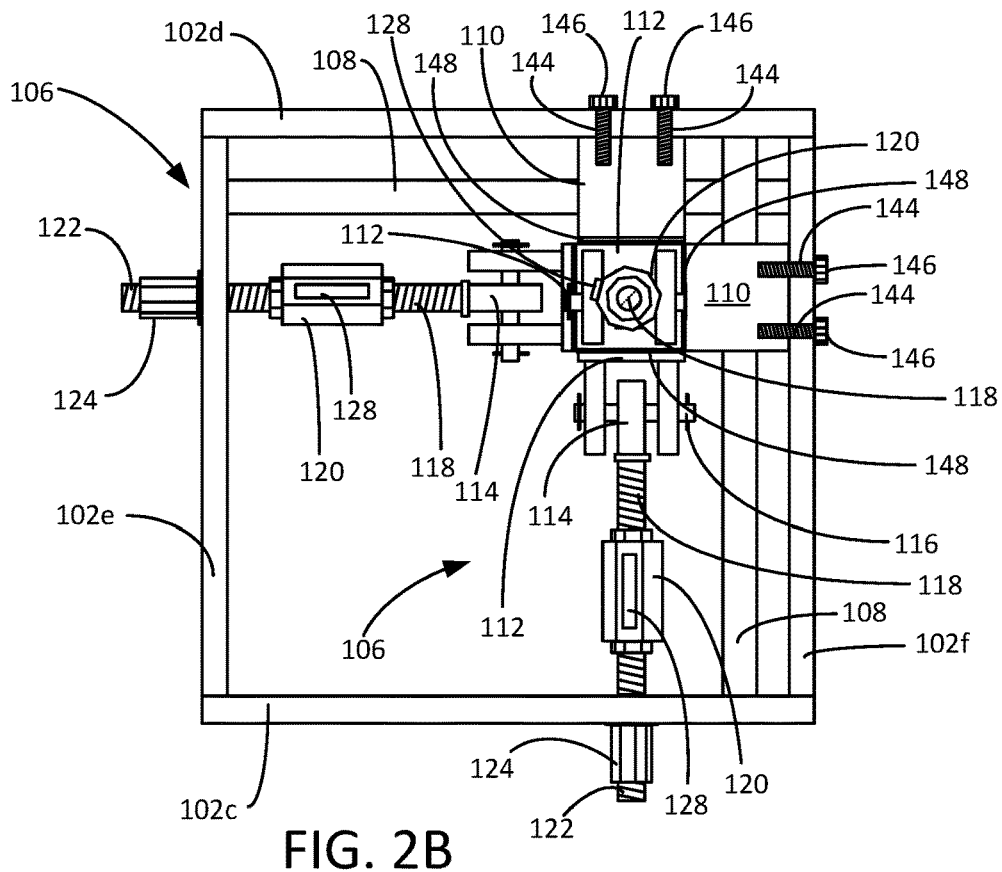

Turning to FIGS. 2A and 2B, shown therein are top views of the interior of the test apparatus 100 with the top side 102a removed. The test apparatus 100 is configured to support the use of up to three tensile force application assemblies 106 (only two are shown in FIG. 2A), which extend between opposing sides 102 of the test apparatus 100. Each force application assembly 106 is configured to apply a tensile force (load) to a sample 200. In a typical embodiment the sample 200 (also referred to herein as a test sample) has a shape of a rectangular prism, such as a cube or cuboid. In a typical embodiment the sample 200 is solid. It may be substantially rigid, plastic, or flexible. In some embodiments, the test apparatus 100 also includes braces 108 that further strengthen the containment chamber 105. The braces 108 are rigid members that extend between opposite sides 102 to reduce the risk the sides 102 bend or deflect during the application of tension by one or more of the force application assemblies 106. The braces 108 can also be manufactured from high strength aluminum or other metals or metal alloys.

Figure 3A:
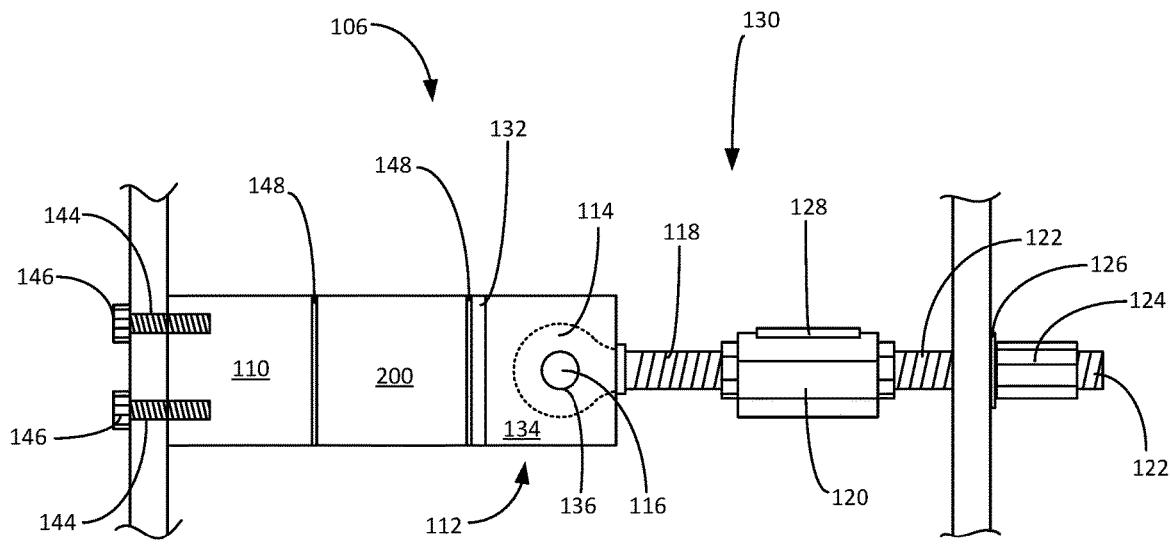
FIGS. 3A-3B depict side and top views, respectively, of one of the force application assemblies from the test apparatus of FIG. 1.
Figure 3B:
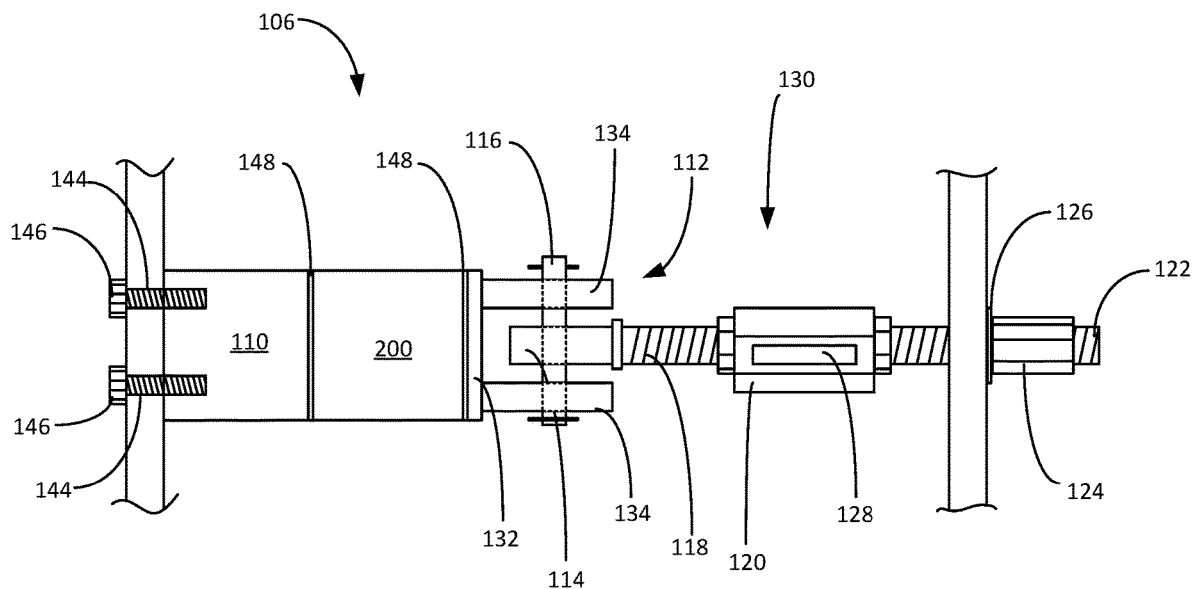

Turning to FIGS. 3A-3B, shown therein are side and top views, respectively, of one of the force application assemblies 106. Each force application assembly 106 includes an anchor 110, a connector 112, and a tension rod assembly 130. The anchor 110 and connector 112 are configured to be attached to the sample 200. The anchor 110 secures the sample 200 to an interior side 102 of the test apparatus 100. The tension rod assembly 130 is releasably secured to the sample 200 with the connector 112. The tension rod assembly 130 extends through an opposite side 102 of the test apparatus from the corresponding anchor 110 and is configured to impart the tensile load to the sample 200 through the connector 112.

In exemplary embodiments, the tension rod assembly 130 may include a rod end 114, a shank 116, a rod end shaft 118, a shaft coupler 120, a tension rod 122, an adjustment nut 124, a bearing 126, and a tension gauge 128. It will be understood that in some embodiments, the force application assembly 106 may not include all of these components. In other embodiments, the force application assembly 106 may include additional elements not depicted in the drawings.

In the embodiments depicted in FIGS. 5A-5B, the connector 112 is a clevis bracket that includes a base 132 and two arms 134 extending from the base 132. Each arm 134 includes a shank aperture 136 sized and configured to accept the shank 116. The rod end 114 can be secured to the connector or clevis bracket 112 by placing the rod end 114 between the two arms 134 and then passing the shank 116 through the two arms 134 and the eye of the rod end 114. The shank 116 can be secured within the clevis bracket 112 by a lock ring or clip. In exemplary embodiments, the rod end 114 is secured within the clevis bracket 112 in a manner that permits the rod end 114 to rotate and rock slightly on the shank 116. This degree of movement ensures that the force transferred through the rod end 114 and shank 116 to the clevis bracket 112 is applied in a single axial direction without a torque or other moment applied through the clevis bracket 112. The clevis bracket 112 and rod end 114 can be manufactured from aluminum, steel or other metal or metal alloys. In other embodiments, the base 132 of the connector 112 includes a threaded bore configured to engage a threaded end of tension rod assembly 130. In other embodiments, the base 132 of the connector 112 includes a tongue or groove feature that mates with a corresponding tongue or groove feature on the tension rod assembly 130. In yet other embodiments, the base 132 of the connector 112 includes a loop that is configured for engagement with a releasable latch on the tension rod assembly. In each case, the connector 112 provides a secure but selectively releasable connection between the tension rod assembly 130 and the sample 200 to permit the removal of the sample 200 and connector 112 from the tension rod assembly 130 in the test apparatus 100. Thus, as used herein, the term "connector" refers broadly to any connecting mechanism that attaches the tension rod assembly 130 to the sample 200 in a manner that substantially isolates a tensile or compressive load from the tension rod assembly 130 to an axis intersecting the sample 200 without applying torque or lateral loads to the sample 200 through the connector 112.

In the embodiments depicted in FIGS. 6A and 6B, the anchor 110 is a plinth that is generally cube-shaped and includes plinth apertures 138 on a back face 140. The anchor or plinth 110 can be manufactured from aluminum, steel or other metal or metal alloys. The plinth apertures 138 are sized and oriented to match corresponding plate apertures 144 on the right side 102f, the back side 102d and the bottom side 102b. Plinth bolts 146 can be used to secure each plinth 110 to the interior of the corresponding side 102 of the test apparatus 100. The plinth 110 has a front face 142 that is configured for adhesion to the sample 200. In some embodiments, the plinths 110 are constructed from ASTM B221 (2020), Grade 6061 aluminum bars.

Figure 7:
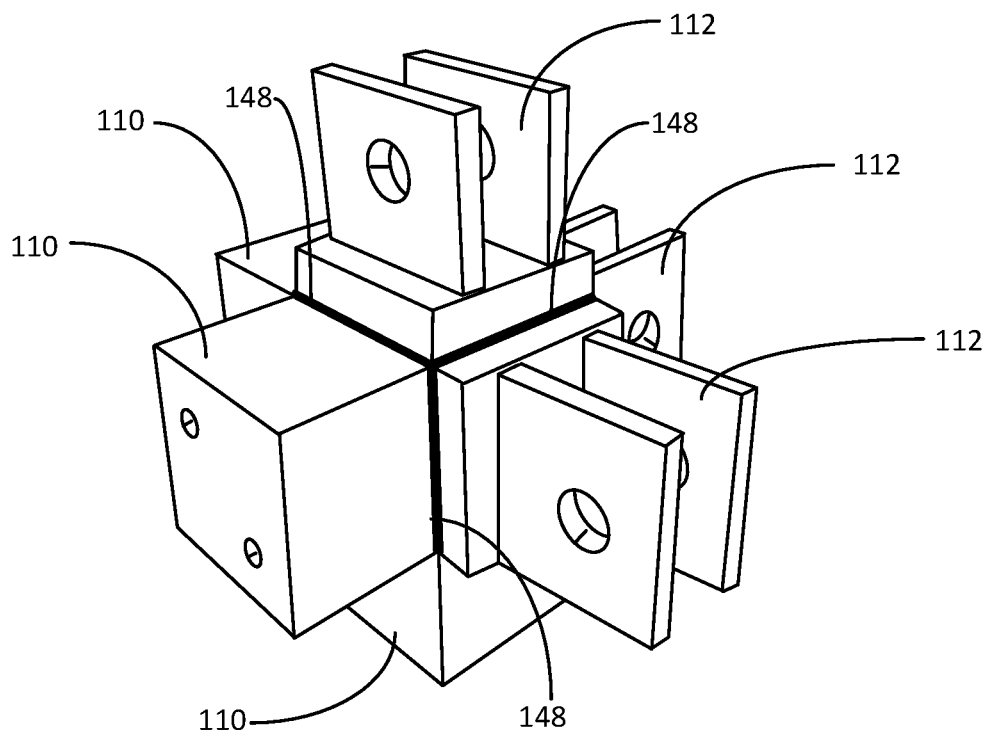
FIG. 7 provides a perspective view of the three clevis brackets and three plinths attached to a UHPC sample cube for triaxial tensile testing.

As explained above, the anchor or plinth 110 and the connector or clevis bracket 112 are engaged with opposite sides of the sample 200. For example, the plinth 110 and clevis bracket 112 may be secured to opposite sides of the sample 200 with a strong epoxy adhesive or other adhesive or other means for securing, such as screws. Epoxies marketed under the "JB Weld" brand have been found to provide a suitably strong bond between the sample 200 and the plinth 110 and clevis bracket 112, although the present disclosure is not limited to such adhesives. In exemplary embodiments, an epoxy layer 148 is placed on the front face 142 of the plinth 110 and the back of the base 132 of the clevis bracket 112. To ensure satisfactory adhesion, the plinth 110 and the clevis bracket 112 can be secured to the sample 200 using an epoxy jig that holds the plinth 100 and clevis bracket 112 in place while the epoxy cures. As depicted in FIG. 7, up to three sets of plinths 110 and clevis brackets 112 can be secured to a single sample 200 for triaxial tension testing.

Turning back to FIGS. 3A and 3B, the rod end shaft 118 is connected to an interior end of the shaft coupler 120 with a threaded engagement. The exterior end of the shaft coupler 120 is connected to a first end of the tension rod 122, which is also configured for a threaded engagement. Lock nuts can be used to prevent the shaft coupler 120 from disengaging from the rod end 114 and tension rod 122. Each tension rod 122 extends through a corresponding rod aperture 150 in the top side 102a, front side 102c and left side 102e, where the adjustment nut 124 is secured to a second end of the tension rod 122. In some embodiments, the rod end 114 has a strength of 10,000 pounds and the tension rod 122 is an ASTM A193 (2020), Grade B7 tension rod.

The adjustment nut 124 is engaged over the distal end of the tension rod 122 and approximated against the side 102 of the test apparatus 100. The tension rod 122 includes a threaded portion on which the adjustment nut 124 is engaged. In some embodiments, the entire tension rod 122 is threaded. The bearing 126 can be placed around the tension rod 122 between the adjustment nut 124 and the corresponding side 102 to facilitate the rotation of the adjustment nut 124. In some embodiments, the bearing 126 includes a series of needle roller thrust bearings contained between two outer washers. In this way, rotation of the adjustment nut 124 in a first (tightening) direction draws the tension rod 122 outward (away from the sample 200) as the adjustment nut 124 presses against the bearing 126 and side 102. The tension rod 122 remains substantially stationary and is not intentionally rotated with the adjustment nut 124. Any torque that is passed from the adjustment nut 124 to the tension rod 122 is offset by the connection between the rod end 114 and the shank 116.

Once the sample 200 has been engaged with (e.g., secured to) the requisite anchor 110 and connector 112, a precise axially-directed tensile load can be applied to the sample 200 by anchoring the plinth 110 to a first side 102, connecting the tension rod assembly 130 to the sample 200 through the connector 112, and then tightening the adjustment nut 124 with a wrench or other tool to induce a tensile force through the tension rod assembly 130, which is carried to the sample 200 through the connector 112. The anchor (or plinth) 110 acts as a fixture to hold the sample 200 in a stationary position within the test apparatus 100 during the application of the tensile load. The use of removable plinths 110 and clevis brackets 112 permits the facilitated attachment and removal of samples 200 without the need to disassemble the entire test apparatus 100 or remove the tension rod assemblies 130 from the test apparatus 100. The plinths 110 and clevis brackets 112 can be secured to the sample 200 "offline" while the sample 200 is awaiting testing without occupying the test apparatus 100.

In addition to connecting the rod end shaft 114 to the tension rod 122, the shaft coupler 120 also supports the tension gauge 128. The shaft coupler 120 and tension gauge 128 act together as a load cell that detects the amount of tension applied by the force application assembly 106. In exemplary embodiments, the tension gauge 128 is a strain gauge that measures force based on changes to the electrical resistivity of the strain gauge. Suitable strain gauges are available from Omega Engineering, Inc. and National Instruments. In some embodiments, two strain gauges are attached to opposite sides of the shaft coupler 120. The tension gauges 128 and their wires 152 can be covered with silicone to protect them from accidental contact. As illustrated in FIG. 1, the tension gauges 128 are connected to an appropriate interface bus 154, which in turn is connected to a computer 156. Using LabVIEW or other analytical software, the computer 156 can be configured to measure the tension force applied through to the sample 200 by each force application assembly 106. Before use with the test apparatus 100, each tension gauge 128 can be calibrated using a benchmark testing frame.

Figure 8A:
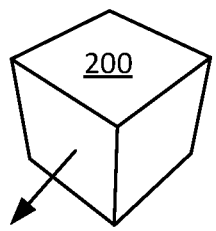
FIGS. 8A-8E depict the various forces applied to a cube specimen that can be evaluated using the test apparatus of FIG. 1.
Figure 8B:
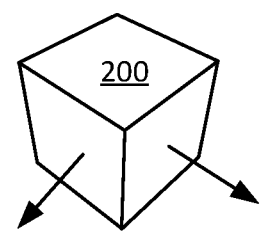
Figure 8C:
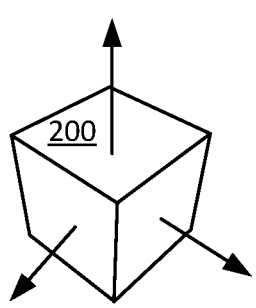
Figure 8D:
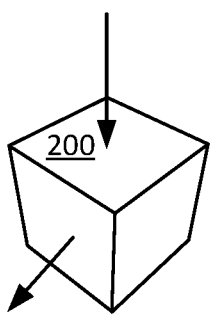
Figure 8E:
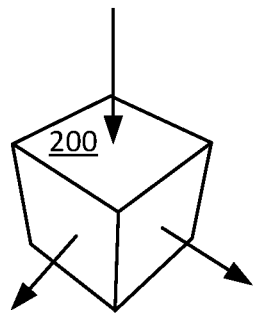

As illustrated in FIGS. 8A-E, the test apparatus 100 is capable of testing a tensile load applied in a single direction (uniaxial) (FIG. 8A), tensile loads applied in two directions (biaxial) (FIG. 8B), tensile loads applied in three directions (triaxial) (FIG. 8C), a compressive load applied in one direction with a tensile load in another direction (FIG. 8D), and a compressive load applied in one direction and tensile loads applied in the other two directions (FIG. 8E). For the uniaxial test depicted in FIG. 8A, the sample 200 is secured to a single force application assembly 106, which is then positioned within the test apparatus 100. Tightening the adjustment nut 124 in a tightening direction induces a tensional force on the sample 200 in a uniaxial direction, which is reported by the tension gauge 128. For the biaxial tension test depicted in FIG. 8B, the sample 200 is connected to two force application assemblies 106, which apply tensional forces to the sample 200 in substantially orthogonal directions. Similarly, for the triaxial tension test depicted in FIG. 8C, the sample 200 is connected to three force application assemblies 106, which apply tensional forces to the sample in three substantially orthogonal directions.

For the "tension-compression" and "tension-tension-compression" tests, the sample 200 is connected to one or two force application assemblies 106, respectively, which apply tensional loads between the front and back sides 102c, 102d for the "tension-compression" test depicted in FIG. 8D, and between the front and back sides 102c, 102d and the left and right sides 102e, 102f for the "tension-tension-compression" test depicted in FIG. 8E. In each case, the top side 102a is removed and a calibrated press (not shown) is used to apply a compression load to the top of the sample 200. It will be appreciated that the sample 200 is supported by the third plinth 110, which is connected between the sample 200 and the bottom side 102b to oppose the compressive force applied by the press. In some embodiments, a compressive force can be applied by the tension rod assembly 130 by rotating the tension rod 122 in a direction that advances the tension rod 122 into the test apparatus 100 such that the rod end 114 presses the connector (clevis bracket) 112 against the sample 200. The tension gauge 128 can be configured to measure the compressive force applied by the tension rod assembly 130.

Although the test apparatus 100 is well suited for testing the strength of samples 200 made from conventional concretes and ultra-high performance concretes (UHPCs), it will be appreciated that the test apparatus 100 can also be used to test the strength of other materials, including ceramics, composites, elastomers, metals, and metal alloys. For use in connection with these samples 200, the plinths 110 and clevis brackets 112 may be secured using alternate epoxies or adhesives or other fasteners such as screws or bolts that are designed for use in connection with the material under evaluation.

Figure 9:
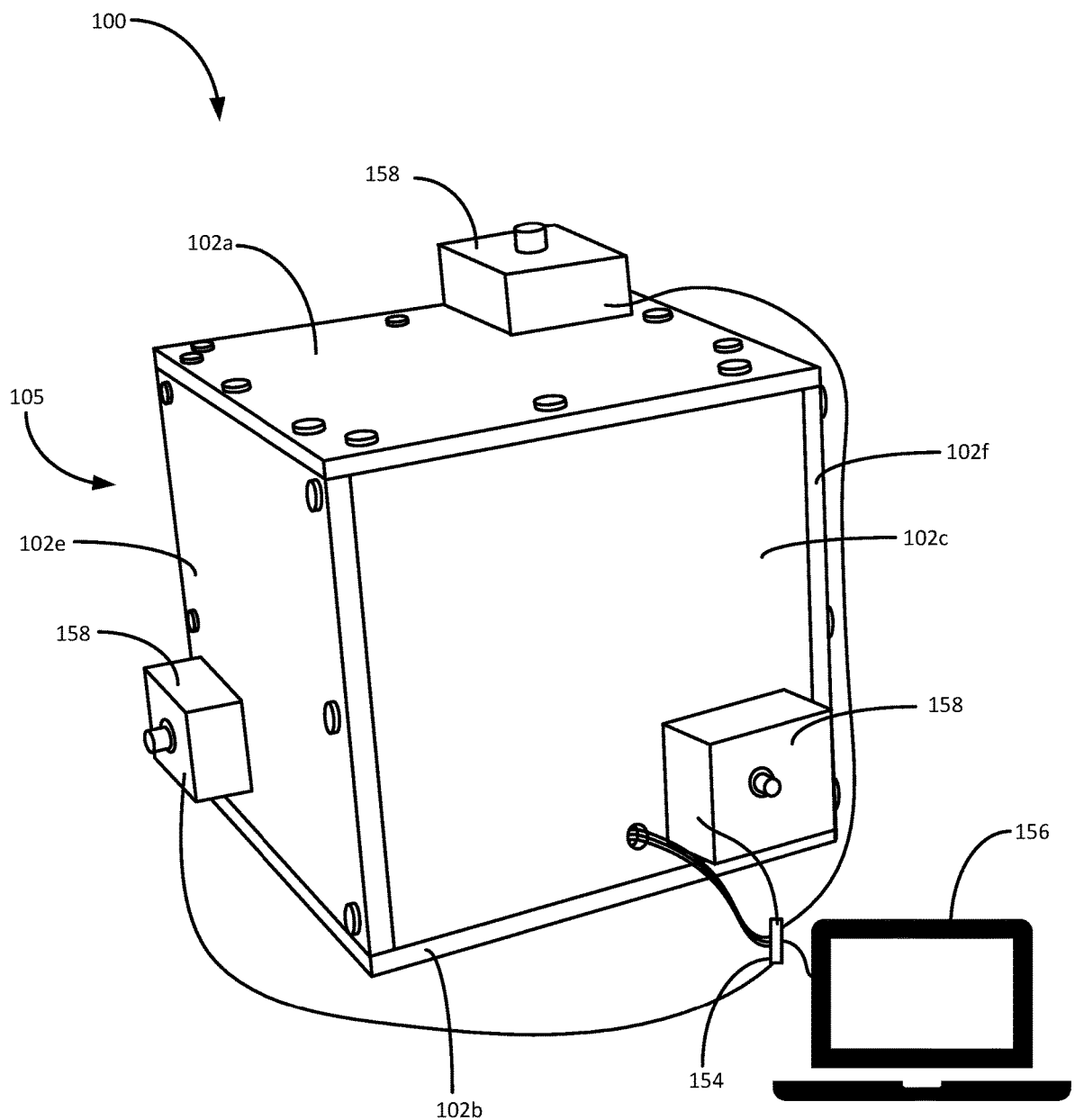
FIG. 9 depicts an alternate embodiment of the test apparatus in which motors are used to apply force to the tension rods of the force application assemblies.

In the embodiment depicted in FIG. 9, motors 158 are used to rotate the adjustment nut 124 to apply the tensional force to the tension rods 122. The motors 158 are connected to an automated motor drive system that turns the adjustment nut 124 to achieve a specified tension force to the tension rods 122 using live output from the tension gauges 128. The motors 158 can also be programmed to control the rate at which tensile loading is placed on the sample by increasing or decreasing the rotational speed of the adjustment nut 124. The use of these motors 158 allows the operator to specify a peak tensile force applied by each of the force application assemblies 106, as well as enabling the operator to conduct tests at various rates of loading (e.g., rapid "shock" loading, gradual loading, etc.), at prolonged static loading with automatic adjustments for elastic relaxation within the force application assemblies 106, and at oscillating tension forces in which the amount of tensile force is increased and decreased over the test period according to a programmed force profile.

Therefore, in at least a first non-limiting embodiment, the present disclosure is directed to a test apparatus for applying one or more tensile loads to a test sample. The test apparatus comprises a housing, wherein the housing comprises a plurality of interconnected sides; and one or more force application assemblies each configured to apply a distinct tensile load on the sample, wherein each of the one or more force application assemblies comprises an anchor engageable with a first side of the sample and a first side of the housing; a connector bracket engageable with a second side of the sample, wherein the second side of the sample is opposite the first side of the sample; and a tension rod assembly attached to the connector, where the tension rod assembly extends through a second side of the housing, wherein the second side of the housing is opposite the first side of the housing.

In the test apparatus the clevis bracket (connector) and the plinth (anchor) of each of the one or more force application assemblies may be secured to the sample with an epoxy adhesive. The rod end may comprise a rod end shaft. Each of the one or more tension rod assemblies may comprise a shaft coupler that connects the tension rod to the rod end shaft. Each of the one or more tension rod assemblies may comprise a tension gauge configured to measure the amount of tension applied by the force application assembly. The tension gauge may be located on the shaft coupler. Each of the one or more tension rod assemblies may comprise an adjustment nut attached to the tension rod, wherein rotation of the adjustment nut in a tightening direction increases the tensile force applied by the tension rod. Each of the one or more force application assemblies may comprise a motor configured to rotate the tension rod to adjust the amount of tension applied by the tension rod. In non-limiting embodiments, the sample may be a material selected from the group consisting of ceramics, composites, polymers, elastomers, metals, metal alloys, and concretes. The concrete may be an ultra-high performance concrete. The sample may comprise a substantially cubic or cuboid shape.

In at least a second non-limiting embodiment, the present disclosure is directed to a test apparatus for applying one or more tensile loads to a sample, the test apparatus comprising (1) a housing, wherein the housing comprises a plurality of interconnected sides; (2) a first force application assembly configured to apply a tensile load on the sample along a first axis, wherein the first force application assembly comprises a first plinth anchored to a first side of the housing and engageable with a first side of the sample; a first clevis bracket engageable with a second side of the sample, wherein the second side of the sample is opposite the first side of the sample; a first tension rod, wherein the first tension rod extends through a second side of the housing, wherein the second side of the housing is opposite the first side of the housing; and a first rod end connected between the first tension rod and the first clevis bracket; and (3) a second force application assembly configured to apply a tensile load on the sample along a second axis, wherein the second force application assembly comprises a second plinth anchored to a third side of the housing and engageable with a third side of the sample; a second clevis bracket engageable with a fourth side of the sample, wherein the fourth side of the sample is opposite the third side of the sample; a second tension rod, wherein the second tension rod extends through a fourth side of the housing, wherein the fourth side of the housing is opposite the third side of the housing; and a second rod end connected between the second tension rod and the second clevis bracket.

In the second test apparatus the first clevis bracket and the first plinth may be secured to the sample, for example by an epoxy adhesive, and the second clevis bracket and the second plinth may be secured to the sample, for example by an epoxy adhesive. The first force application assembly may comprise a first shaft coupler that connects the first tension rod to the first rod end shaft; and a first tension gauge located on the first shaft coupler and configured to measure the amount of tension applied by the first force application assembly. The first force application assembly may comprise a first adjustment nut attached to the first tension rod and wherein rotation of the first adjustment nut in a tightening direction increases the tensile force applied by the first tension rod. The second force application assembly may comprise a second shaft coupler that connects the second tension rod to the second rod end shaft; and a second tension gauge located on the second shaft coupler and configured to measure the amount of tension applied by the second force application assembly. The second force application assembly may comprise a second adjustment nut attached to the second tension rod and wherein rotation of the second adjustment nut in a tightening direction increases the tensile force applied by the second tension rod. Each first and/or second force application assembly may comprise a motor configured to adjust (for example rotate) the tension rod to adjust the amount of tension applied by the tension rod to the sample. In non-limiting embodiments, the sample may be a material selected from the group consisting of ceramics, composites, polymers, elastomers, metals, metal alloys, and concretes. The concrete may be an ultra-high performance concrete. The sample may comprise a substantially cubic or cuboid shape.

The second test apparatus may comprise (4) a third force application assembly configured to apply a tensile load to the sample along a third axis, wherein the third force application assembly comprises a third plinth anchored to a fifth side of the housing and engageable with a fifth side of the sample; a third clevis bracket engageable with a sixth side of the sample, wherein the sixth side of the sample is opposite the fifth side of the sample; a third tension rod, wherein the third tension rod extends through a sixth side of the housing, wherein the sixth side of the housing is opposite the fifth side of the housing; and a third rod end connected between the third tension rod and the third clevis bracket. he third force application assembly may be configured to apply a tensile load on the sample along the third axis. The third clevis bracket and the third plinth may be secured to the sample, for example by an epoxy adhesive. The third force application assembly may comprise a third adjustment nut attached to the third tension rod and wherein rotation of the third adjustment nut in a tightening direction increases the tensile force applied by the third tension rod. The third force application assembly may comprise a motor configured to adjust (e.g., by rotation) the tension rod to adjust the amount of tension applied by the tension rod.

In at least a third non-limiting embodiment, the present disclosure is directed to a test apparatus for applying one or more tensile loads to a sample, the test apparatus comprising (1) a housing, wherein the housing comprises a plurality of interconnected sides; (2) a first force application assembly configured to apply a tensile load on the sample along a first axis, wherein the first force application assembly comprises a first plinth anchored to a first side of the housing and engageable with a first side of the sample; a first clevis bracket engageable with a second side of the sample, wherein the second side of the sample is opposite the first side of the sample; a first tension rod, wherein the first tension rod extends through a second side of the housing, wherein the second side of the housing is opposite the first side of the housing; and a first rod end connected between the first tension rod and the first clevis bracket; (3) a second force application assembly configured to apply a tensile load on the sample along a second axis, wherein the second force application assembly comprises a second plinth anchored to a third side of the housing and engageable with a third side of the sample; a second clevis bracket engageable with a fourth side of the sample, wherein the fourth side of the sample is opposite the third side of the sample; a second tension rod, wherein the second tension rod extends through a fourth side of the housing, wherein the fourth side of the housing is opposite the third side of the housing; and a second rod end connected between the second tension rod and the second clevis bracket; and (4) a third force application assembly configured to apply a load on the sample along a third axis, wherein the third force application assembly comprises a third plinth anchored to a fifth side of the housing and engageable with a fifth side of the sample; a third clevis bracket engageable with a sixth side of the sample, wherein the sixth side of the sample is opposite the fifth side of the sample; a third tension rod, wherein the third tension rod extends through a sixth side of the housing, wherein the sixth side of the housing is opposite the fifth side of the housing; and a third rod end connected between the third tension rod and the third clevis bracket. Each first, second, and third force application assembly may comprise a motor configured to adjust (e.g., by rotation) the tension rod to adjust the amount of tension applied by the tension rod. In non-limiting embodiments, the sample may be a material selected from the group consisting of ceramics, composites, polymers, elastomers, metals, metal alloys, and concretes. The concrete may be an ultra-high performance concrete. The sample may comprise a substantially cubic or cuboid shape.

In another embodiment, the present disclosure is directed to a method of analyzing a tensile behavior of a test sample, the method comprising the steps of (1) providing a test sample comprising at least a first side, a second side opposite the first side, a third side, a fourth side opposite the third side, a fifth side, and a sixth side opposite the fifth side; (2) providing a test apparatus comprising (a) a housing comprising a first side, a second side opposite the first side, a third side, and a fourth side opposite the third side, (b) a first force application assembly configured to apply a first tensile load to the test sample along a first axis, wherein the first force application assembly comprises (i) a first plinth anchored to the first side of the housing, (ii) a first clevis bracket, and (iii) a first tension rod having a first rod end, wherein the first tension rod extends through the second side of the housing, and wherein the first clevis bracket is connected to the first rod end; and (c) a second force application assembly configured to apply a second tensile load to the rigid test sample along a second axis, wherein the second force application assembly comprises (i) a second plinth anchored to the third side of the housing, (ii) a second clevis bracket, (iii) a second tension rod having a second rod end, wherein the second tension rod extends through the fourth side of the housing, and wherein the second clevis bracket is connected to the second rod end; (3) engaging the first plinth with the first side of the test sample; (4) engaging the first clevis bracket with the second side of the test sample; (5) engaging the second plinth with the third side of the test sample; (6) engaging the second clevis bracket with the fourth side of the test sample; (7) securing the first plinth to the first side of the housing; (8) attaching the first rod end to the first clevis bracket; (9) securing the second plinth to the third side of the housing; (10) attaching the second rod end to the second clevis bracket; (11) applying the first tensile load to the test sample via the first force application assembly; and (12) applying the second tensile load to the test sample via the second force application assembly. The test apparatus may further comprise a fifth side in the housing and a sixth side opposite the fifth side of the housing; and a third force application assembly configured to apply a third tensile load to the test sample along a third axis, wherein the third force application assembly comprises: a third plinth anchored to the fifth side of the housing; a third clevis bracket; a third tension rod having a third rod end, wherein the third tension rod extends through the sixth side of the housing, and wherein the third clevis bracket is connected to the third rod end. The method may further comprise the steps of engaging the third plinth with the fifth side of the test sample; engaging the third clevis bracket with the sixth side of the test sample; and applying the third tensile load to the test sample via the third force application assembly. The test sample may comprise a material selected from the group consisting of ceramics, composites, polymers, elastomers, metals, metal alloys, and concretes, and an ultra-high performance concrete. The test sample may have a cube or cuboid shape. In the engaging steps, the plinths and/or clevis brackets may independently be secured (i.e., attached or connected) to the respective sides of the test sample.

Thus, the embodiments of the present disclosure are well adapted to carry out the objects and attain the ends and advantages mentioned above, as well as those inherent therein. While the test apparatus has been described and illustrated herein by reference to particular non-limiting embodiments in relation to the drawings attached thereto, various changes and further modifications, apart from those shown or suggested herein, may be made therein by those of ordinary skill in the art, without departing from the spirit of the inventive concepts.

It is claimed:

1. A test apparatus for applying one or more tensile loads to a test sample, the test apparatus comprising:
   a housing, wherein the housing comprises at least a first side, and a second side opposite the first side; and
   one or more force application assemblies each configured to apply a corresponding tensile load to the test sample, wherein each of the one or more force application assemblies comprises:
   an anchor engageable with a first side of the test sample and the first side of the housing;
   a connector engageable with a second side of the test sample, wherein the second side of the test sample is opposite the first side of the test sample;
   a tension rod assembly attached to the connector; and wherein the connector comprises a clevis bracket and the anchor comprises a plinth.

2. The test apparatus of claim 1, wherein the tension rod assembly comprises:
   a tension rod that extends through the second side of the housing; and
   a rod end connected between the tension rod and the connector.

3. The test apparatus of claim 1, wherein the clevis bracket and the plinth of each of the one or more force application assemblies are securable to the test sample with an epoxy adhesive.

4. The test apparatus of claim 3, wherein each tension rod assembly further comprises a shaft coupler that connects the tension rod to the rod end shaft.

5. The test apparatus of claim 4, wherein each tension rod assembly further comprises a tension gauge configured to measure the tensile load applied by the tension rod assembly.

6. The test apparatus of claim 5, wherein the tension gauge is located on the shaft coupler.

7. The test apparatus of claim 5, wherein each tension rod assembly further comprises an adjustment nut attached to the tension rod and wherein rotation of the adjustment nut in a tightening direction increases the tensile load applied by the tension rod.

8. The test apparatus of claim 1, wherein each of the one or more force application assemblies further comprises a motor configured to adjust the amount of force applied by the tension rod assembly.

9. The test apparatus of claim 1, wherein the test sample comprises a material selected from the group consisting of ceramics, composites, polymers, elastomers, metals, metal alloys, concretes, and an ultra-high performance concrete.

10. A test apparatus for applying one or more tensile loads to a test sample, the test apparatus comprising:
   a housing comprising a first side, a second side opposite the first side, a third side, and a fourth side opposite the third side;
   a first force application assembly configured to apply a tensile load on the test sample along a first axis, wherein the first force application assembly comprises:
      a first plinth anchored to the first side of the housing and engageable with a first side of the test sample;
      a first clevis bracket engageable with a second side of the test sample, wherein the second side of the sample is opposite the first side of the test sample;
      a first tension rod, wherein the first tension rod extends through the second side of the housing; and
      a first rod end connected between the first tension rod and the first clevis bracket; and
   a second force application assembly configured to apply a tensile load on the test sample along a second axis, wherein the second force application assembly comprises:
      a second plinth anchored to the third side of the housing and engageable with a third side of the test sample;
      a second clevis bracket engageable with a fourth side of the test sample, wherein the fourth side of the sample is opposite the third side of the test sample;
      a second tension rod, wherein the second tension rod extends through the fourth side of the housing; and
      a second rod end connected between the second tension rod and the second clevis bracket.

11. The test apparatus of claim 10, wherein the housing comprises a fifth side and a sixth side opposite the fifth side, the test apparatus further comprising:
   a third force application assembly configured to apply a load on the test sample along a third axis, wherein the third force application assembly comprises:
      a third plinth anchored to the fifth side of the housing and engageable with a fifth side of the test sample;
      a third clevis bracket engageable with the sixth side of the test sample, wherein the sixth side of the sample is opposite the fifth side of the sample;
      a third tension rod, wherein the third tension rod extends through the sixth side of the housing; and
      a third rod end connected between the third tension rod and the third clevis bracket.

12. The test apparatus of claim 11, wherein the third force application assembly is configured to apply a tensile load on the test sample along the third axis.

13. The test apparatus of claim 11, wherein the first, second and third clevis brackets and the first, second and third plinths are securable to the test sample with an epoxy adhesive.

14. The test apparatus of claim 10, wherein the first force application assembly further comprises:
   a first shaft coupler that connects the first tension rod to the first rod end shaft; and
   a first tension gauge located on the first shaft coupler and configured to measure the amount of tension applied by the first force application assembly.

15. The test apparatus of claim 14, wherein the first force application assembly further comprises a first adjustment nut attached to the first tension rod and wherein rotation of the first adjustment nut in a tightening direction increases the tensile force applied by the first tension rod.

16. The test apparatus of claim 10, wherein the second force application assembly further comprises:
   a second shaft coupler that connects the second tension rod to the second rod end shaft; and
   a second tension gauge located on the second shaft coupler and configured to measure the amount of tension applied by the second force application assembly.

17. The test apparatus of claim 16, wherein the second force application assembly further comprises a second adjustment nut attached to the second tension rod and wherein rotation of the second adjustment nut in a tightening direction increases the tensile force applied by the second tension rod.

18. The test apparatus of claim 10, wherein each of the first and second application assemblies comprises a motor configured to adjust the amount of tension applied by the first and second tension rods, respectively.

19. The test apparatus of claim 10, wherein the third force application assembly comprises a motor configured to adjust the amount of tension applied by the third tension rod.

20. A method of analyzing a tensile behavior of a test sample, the method comprising the steps of:
   providing a test sample, the test sample comprising at least a first side, a second side opposite the first side, a third side, a fourth side opposite the third side, a fifth side, and a sixth side opposite the fifth side;
   providing a test apparatus comprising:
      a housing comprising a first side, a second side opposite the first side, a third side, and a fourth side opposite the third side;
      a first force application assembly configured to apply a first tensile load to the test sample along a first axis, wherein the first force application assembly comprises:
         a first plinth;

a first clevis bracket; and a first tension rod assembly that includes a first tension rod and a first rod end, wherein the first tension rod extends through the second side of the housing; and a second force application assembly configured to apply a second tensile load to the test sample along a second axis, wherein the second force application assembly comprises:

a second plinth;

a second clevis bracket; and a second tension rod assembly that includes a second tension rod and a second rod end, wherein the second tension rod extends through the fourth side of the housing;

engaging the first plinth with the first side of the test sample;

engaging the first clevis bracket with the second side of the test sample;

engaging the second plinth with the third side of the test sample;

engaging the second clevis bracket with the fourth side of the test sample;

securing the first plinth to the first side of the housing;

attaching the first rod end to the first clevis bracket;

securing the second plinth to the third side of the housing;

attaching the second rod end to the second clevis bracket;

applying the first tensile load to the test sample with the first force application assembly; and applying the second tensile load to the test sample with the second force application assembly.

21. The method of claim 20, further comprising the step of positioning the rigid test sample within the housing after the steps of engaging the first plinth, the first clevis bracket, the second plinth and the second clevis bracket with the test sample.

22. The method of claim 20, further comprising the step of positioning the rigid test sample within the housing before the steps of engaging the first plinth, the first clevis bracket, the second plinth and the second clevis bracket with the test sample.

23. The method of claim 20, wherein the step of providing a test apparatus further comprises providing a test apparatus comprising:

a fifth side in the housing and a sixth side opposite the fifth side of the housing; and a third force application assembly configured to apply a third tensile load to the test sample along a third axis, wherein the third force application assembly comprises:

a third plinth;

a third clevis bracket; and a third tension rod assembly that includes a third tension rod and a third rod end, wherein the third tension rod extends through the sixth side of the housing, and wherein the third clevis bracket is connected to the third rod end.

24. The method of claim 23, further comprising the steps of:

engaging the third plinth with the fifth side of the test sample;

engaging the third clevis bracket with the sixth side of the test sample; and applying the third tensile load to the test sample via the third force application assembly.

25. The method of claim 20, wherein the test sample comprises a material selected from the group consisting of ceramics, composites, polymers, elastomers, metals, metal alloys, and concretes, and an ultra-high performance concrete.

26. The method of claim 20, wherein the test sample has a cube or cuboid shape.

* * * * *